Aug. 18, 1964          C. J. ROZELL          3,144,781
BELT GRIPPING PULLEY CONSTRUCTION
Filed May 10, 1962

INVENTOR
*Charles J. Rozell*

United States Patent Office 3,144,781
Patented Aug. 18, 1964

3,144,781
BELT GRIPPING PULLEY CONSTRUCTION
Charles J. Rozell, La Fontaine, Ind.
Filed May 10, 1962, Ser. No. 193,730
2 Claims. (Cl. 74—230.24)

This invention relates to devices in the nature of clutches, which are broadly defined as mechanical devices for the engaging or disengaging of two shafts in line with one another or a shaft and some other member such as a wheel, or a belt.

Unfortunately the belt gripping pulley construction is one mechanical device that has repeatedly been overlooked by man as he continually improves machines and their associated parts.

Unfortunately most pulley construction falls into one of two classifications, namely, the very simple ones that are seldom satisfactory by reason of being too simple, and the very complicated ones that are always failing by reason of having too many breakable parts.

It is, therefore, an object of this invention to provide a pulley construction of the mechanical type that is foolproof in its design and construction and will, therefore, never fail under normal usage.

Another object of this invention is to provide a pulley construction of the character described that has so few parts that it can be manufactured and retailed at a price far below the more complicated pulley construction now on the market.

Another object of this invention is to provide a pulley construction of the character described that can readily be used in the most confined space by reason of its small size.

Another object of this invention is to provide a pulley construction of the character described that cannot lock or otherwise jam and therefore cause the machinery to which it is attached to either break or fail to work.

Another object of this invention is to provide a pulley construction of the mechanical type that will not be affected by sudden changes in temperature and it can, therefore, be used successfully in any climate regardless of how hot or cold it may be.

Another object of this invention is to provide a pulley construction that can readily serve as a replacement for any pulley construction now in use without the necessity of extensive modifications to the machinery to which it is to be adapted.

Another object of this invention is to provide a pulley construction of the character described that can readily be manufactured to fit any size of shafts to transmit any amount of horsepower and at any desired r.p.m.

Another object of this invention is to provide a construction that does not require the use of special tools for its installation.

Still another object of this invention is to provide a pulley construction that can be made of extremely light-weight materials for use in instruments of air or spacecraft.

The foregoing and other objects and advantages of the present invention will appear from the following detailed description taken in connection with the accompanying drawing, in which.

Similiar reference characters refer to similar parts throughout the several views of the drawing.

Figure 1:
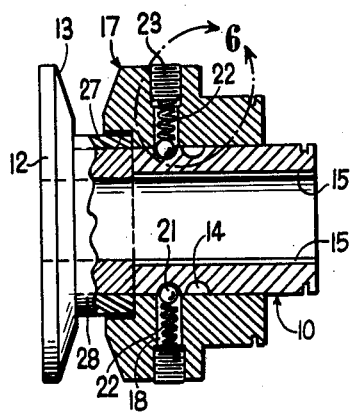
FIGURE 1 is a longitudinal sectional view of this invention showing it in an engaged position.
Figure 2:
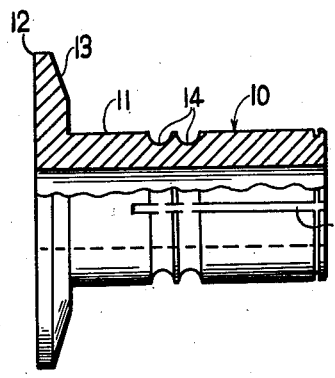
FIGURE 2 is a partial longitudinal sectional view of that part of this invention known as its inner section.

Having reference now to the drawing in detail, there is generally indicated by the character 10 an inner section of this novel invention embodying a hollow shaft 11 having one end terminate in a circular member 12 that is considerably larger than the aforesaid hollow shaft 11 and has an inclined portion 13 as clearly shown in FIGURES 1 and 2 of the appended drawing. The periphery of the aforesaid hollow shaft 11 is provided with a pair of parallel concave portions 14 that encompass the hollow shaft which is also provided with a pair of internal and oppositely located keyway 15 and an alike pair of external and oppositely located keyways 16, although only one of the latter is visible in any views of the appended drawing.

Figure 4:
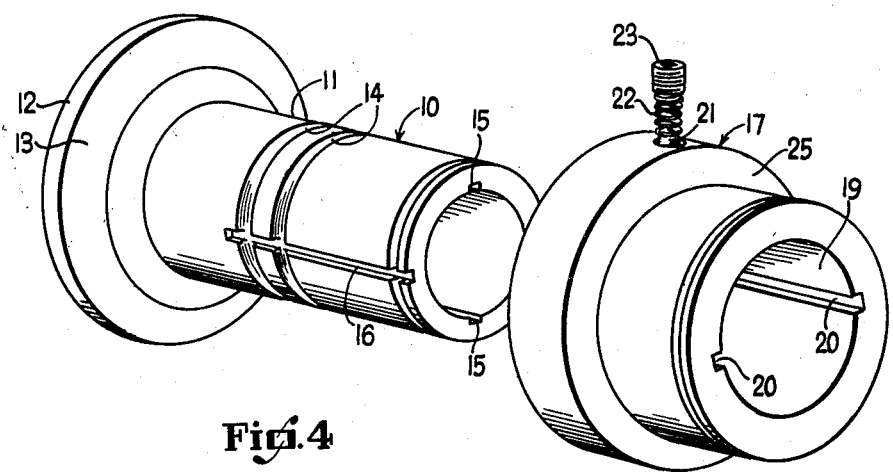
FIGURE 4 is an exploded pictorial view of this invention.

An outer section 17 that is both circular and hollow is provided with a plurality of openings 18 in radial spaced relation to each other and at right angle to the centrally located opening 19 which is adapted to receive the hollow shaft 11 of the inner section 10 of this invention. The aforesaid outer section 17 having a pair of oppositely located keyways 20 for the reception of keys adapted to both the hollow shaft 11 and the outer section 17 as clearly understood from examination of FIGURE 4 of the appended drawing.

The already mentioned outer section 17 is provided with steel balls 21 that are located in the aforesaid openings 18. A coiled spring 22 is located on top of each ball 21 and is held in place by means of a headless set screw 23 that is threaded into the upper half of each one of the aforesaid openings 18 which is counterbored and tapped for this purpose.

A throw out collar 24 encompasses the aforesaid outer section 17. The collar 24 rests against the shoulder 25 of the rear portion of the outer section 17 and is held in place by means of the snap ring 26. A second snap ring 26ᵃ on the outer surface of the hollow shaft 11 secures the two aforesaid keys in place thereon, and to retain outer section 17 on inner section 10.

Figure 3:
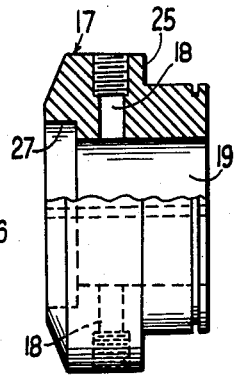
FIGURE 3 is a partial longitudinal sectional view of that part of this invention known as its outer section.
Figure 5:
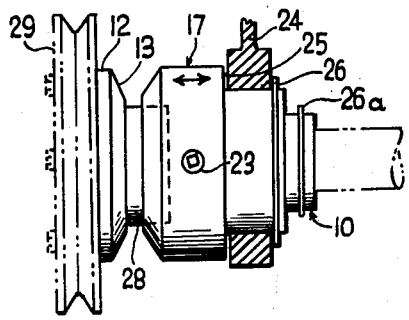
FIGURE 5 is a side view of this invention with a pulley secured to one end thereof and a shaft to the other end.
Figure 6:
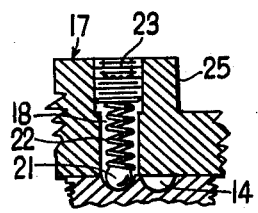
FIGURE 6 is an enlarged sectional detail of that part of this invention enclosed within the arrow circle and numeral 6 in FIGURE 1.

Returning once again to the aforesaid outer section 17 and to FIGURES 1 and 3 of the appended drawing, it will be seen that this member 17 is provided with a centrally located recess 27 for the slidable reception of the brass ring 28. In FIG. 5, a pulley 29 is secured to the aforesaid circular member 12. The brass ring 28 is rotatably mounted on the aforesaid hollow shaft 11 as one can see on examination of FIGURES 1 and 5 of the appended drawing.

The construction of this novel invention has now been described and its method of operation is obvious to those experienced in the art, however for the benefit of those not having this experience, it will be well to review the operation in so far as the outer section 17 is moved longitudinally along the already described hollow shaft 11 and the steel balls 21 are in one of the concave recess portions 14 that is nearest to the centrally located recess 27 in the outer section 17 of this novel invention. In this position of the outer portion 17, outer portion 17 and inclined portion 13 of inner section 10 are in position to be in friction grip with a V-belt, while this outer portion 17 will obviously be disengaged from a V-belt when the throw-out collar 24 pulls the aforesaid outer portion 17 back away from the same and the steel balls slip into the second one of the concave recess portions 14, the inclined surface of 17 is thus back from inclined surface 13 and the V-belt will rest on brass ring 28 and not be driven and thus the belt gripping pulley construction is now disengaged.

With the arrangement of FIG. 5, a V-belt, engaging pulley 29 can be driven whenever the drive shaft shown in phantom, is driven and another V-belt can be driven as desired by means of the pulley.

From the foregoing it will now be seen that there is herein provided a clutch which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative, and not in a limiting sense.

Having described my invention, what I claim, and desire to secure by Letters Patent is:

1. A pulley of the character described, comprising a a hollow section embodying a hollow shaft having a keyway at the inner surface thereof for use in securing said hollow shaft to a drive shaft, one end of said hollow shaft terminating in a large circular portion, an outer hollow cylindrical section slidable on said hollow shaft, the outer surface of said inner section and the inner surface of said outer section having keyways, a key in said keyways to permit sliding of the outer section on said inner section but prevent relative rotation of these sections, the enlarged circular portion of said inner section and the adjacent end of said outer section having confronting faces for tractive engagement with opposite sides of an interposed V-belt, the outer section having a radial bore, a ball detent in said radial bore, the inner section having spaced annular grooves, one groove positioned to engage the ball detent when the confronting surfaces are in position to be in tractive engagement with a V-belt, the outer groove positioned to engage the ball detent when the confronting surfaces are positioned to be out of tractive engagement with a V-belt, a throw out collar surrounding the outer section and means retaining the throw out collar on the outer section.

2. The combination of claim 1, in which a pulley is secured to the outer end of the enlarged circular portion.

References Cited in the file of this patent
UNITED STATES PATENTS

| | | |
|---|---|---|
| 2,182,956 | Beyerline | Dec. 12, 1939 |
| 2,561,833 | Wolf | July 24, 1951 |
| 2,634,620 | Firth | Apr. 14, 1953 |
| 2,709,372 | Melone | May 31, 1955 |